G. W. BOWEN.
LUBRICANT CUP.
APPLICATION FILED FEB. 23, 1905.
1,047,736.
Patented Dec. 17, 1912.
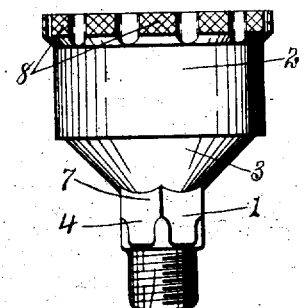
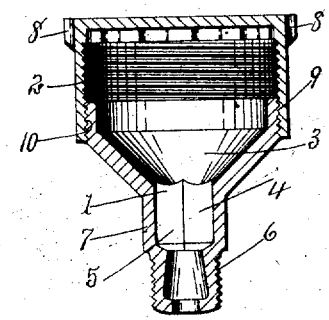
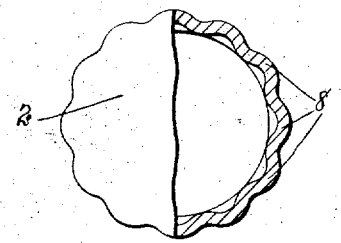
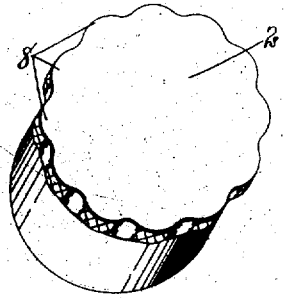
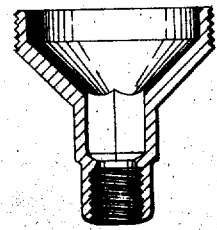
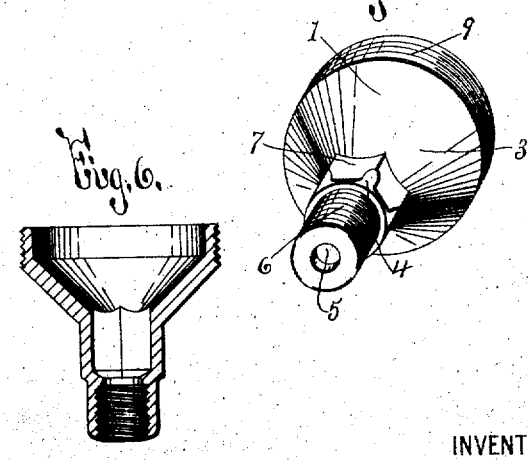
WITNESSES:
Chas. J. Jones.
Chas. H. Young.
INVENTOR
George W. Bowen
BY
Hey Parsons
ATTORNEYS

UNITED STATES PATENT OFFICE.

GEORGE W. BOWEN, OF AUBURN, NEW YORK.

LUBRICANT-CUP.

1,047,750.  Specification of Letters Patent.  Patented Dec. 17, 1912.

Application filed February 23, 1905. Serial No. 246,834.

*To all whom it may concern:*

Be it known that I, GEORGE W. BOWEN, of Auburn, in the county of Cayuga and State of New York, have invented a certain new and useful Lubricant-Cup, of which the following is a specification.

My invention has for its object the production of a lubricant cup which is particularly simple in construction and economical of manufacture; and to this end, it consists in the novel features of construction hereinafter set forth and claimed.

In describing my invention, reference is had to the accompanying drawing in which like characters designate corresponding parts in all the views.

Figure 1 is an elevation of my lubricant cup. Fig. 2 is a vertical sectional view thereof. Fig. 3 is a top plan, partly broken away, of the cap of my cup. Figs. 4 and 5 are isometric views, respectively, of the cap and base thereof. Fig. 6 is a vertical sectional view of a modified construction of the base of my lubricant cup.

This invention consists of a lubricant cup composed of a plurality of parts, each of which is pressed from a single piece of sheet metal. In the illustrated exemplification, the lubricant cup comprises two parts *i. e.*, a base 1 and a cap 2. The base 1 consists of a main body or receptacle 3 and a stem 4, the latter having a passage 5 communicating with the interior of the main body or receptacle 3. Said main body or receptacle 3 is preferably substantially funnel-shaped and preferably formed with a threaded ring at its larger end for receiving the cap 1 and is provided at its top with an upturned flange of substantially uniform thickness, and the stem 4 is usually provided with a threaded end portion 6 and with a part 7 having its inclosing wall formed of substantially uniform thickness and with external and internal faces of angular cross-section. The part receives a wrench or any suitable tool for screwing the base into position. The threaded portion 6 and part 7 are of different diameters and the stem is thickened (Figs. 2 and 6) at the line of union of said threaded portion and angular part for strengthening the stem at this point against breaking when the base is being turned into or out of position. Preferably, the threads on the stem are provided on the exterior of said portion 6, but as seen in Fig. 6, said threads may be formed on the interior thereof.

In the manufacture of the base 1, a piece of flat sheet metal is submitted to the action of dies which first shape the sheet in the form of a cup, then draw out the cup shaped piece into the form of a cone with a substantially cylindrical end and finally shape the metal at the juncture of the cylindrical end and the conical part substantially hexagonal in cross-section, the hexagonal part and the cylindrical end forming a stem portion. Subsequently, the extremity of the stem is perforated and the cylindrical end thereof is threaded. These shaping operations condense a part of the metal of the cup intermediate of the body portion and the end of the stem and bring the same to at least its normal density, thus strengthening the stem and fashioning a part thereof, the hexagonal portion, to serve as a wrench-hold and condensing the metal at the juncture between said wrench-hold and the threaded end or portion to strengthen the same.

The cap 2 is provided with a knurled hand-engaging portion formed by distorting the metal of said cap, thereby causing said hand-engaging portion to project from the adjacent part of the cap. As best seen in Fig. 3, said hand-engaging portion consists of a plurality of peripheral hollow projections or corrugations 8 spaced equal distances apart, and extending from substantially the junction of the top and the peripheral wall of the cap, said projections being formed by distorting and spreading portions of the sides of the cap outwardly laterally relatively to the adjacent parts of the cap, by pressure acting on the interior of the cap in a direction substantially radially relatively to the axis of the cap. Said cap is secured to the base 1 by intermeshing threads 9, 10 formed respectively on the periphery of the upturned flange at the top of the base 1 and on the inner face of the lower end of the cap 2.

The cap 2 is usually formed from a sheet-metal shell, the peripheral projections 8 being formed by crushing the crown of the shell and holding the major portions of the barrel thereof and portions alternating with said projections, from contracting or spreading, thereby forcing outwardly parts of the shell along the line of union of the crown and barrel thereof.

As is obvious, a lubricant cup constructed as described may be manufactured quickly, cheaply and with minimum labor.

The construction of my lubricant cup will now be readily understood upon reference to the foregoing description and the accompanying drawing.

Having thus fully described my invention, what I claim as new and desire to secure by Letters Patent, is:—

1. As an article of manufacture, a single-piece sheet metal grease cup having a body portion, and a depending stem portion formed to engage a support, part of the metal of the cup intermediate the body portion and the end of the stem being condensed to strengthen said stem.

2. As an article of manufacture, a single-piece sheet metal grease cup having a body portion, and a depending stem portion threaded to engage a support, part of the metal of the cup intermediate the body portion and the end of the stem being condensed to strengthen said stem, and fashioned to serve as a wrench-hold.

3. As an article of manufacture, a single-piece sheet metal grease cup having a body portion and a depending stem portion threaded to engage a support, part of the metal of the cup intermediate the body portion and the end of the stem being of at least its normal density, to strengthen said stem.

4. As an article of manufacture, a single-piece sheet metal grease cup having a body portion and a depending stem portion threaded to engage a support, part of the metal of the cup intermediate the body portion and the end of the stem being strengthened and fashioned to serve as a wrench-hold.

5. As an article of manufacture, a single-piece sheet metal grease cup having a body portion and a depending stem portion threaded to engage a support, a part of the cup intermediate the body portion and the end of the stem being fashioned to serve as a wrench-hold, and the juncture between said wrench-hold and threaded portions being strengthened by condensed articles of the metal.

In testimony whereof, I have hereunto signed my name in the presence of two attesting witnesses, at Auburn, in the county of Cayuga, in the State of New York, this 18th day of February, 1905.

GEORGE W. BOWEN.

Witnesses:
FRED H. WIGGINS,
F. G. BODELL.